United States Patent Office 3,028,389
Patented Apr. 3, 1962

3,028,389
BASIC ARALKYL NITRILES AND PROCESS FOR THEIR PREPARATION
Hermann Kasparek, Konstanz, Kurt Stach, Mannheim, and Klaus Pfroepffer, Konstanz, Germany, assignors to Ravensberg G.m.b.H., Chemische Fabrik, Konstanz, Germany
No Drawing. Filed Nov. 12, 1958, Ser. No. 773,194
Claims priority, application Germany Nov. 12, 1957
9 Claims. (Cl. 260—268)

This invention relates generally to pharmacologically active compounds and is particularly directed to basic aralkyl nitriles and a process for their preparation.

It is an object of the invention to provide novel basic aralkyl nitriles, exhibiting a marked analgetic and spasmolytic effect.

A further object of this invention is to provide a one-step process for the preparation of basic aralkyl nitriles which is simple to carry out at low cost and by means of which basic aralkyl nitriles are obtained in a high yield without the formation of isomers. Other objects and advantages of the invention will become apparent from the following description.

In accordance with this invention, basic aralkyl nitriles are obtained in a one-step process and in high yield by first reacting basic ketones with hydrocyanic acid (HCN), converting the hydroxy nitriles thus formed into the corresponding halogen compounds with halogenation agents, such as for example thionyl chloride or phosphorus pentachloride, and thereafter reacting the halogen compound with aromatic ring systems in accordance with Friedel-Crafts.

The course of the inventive process may be illustrated by the following general formula

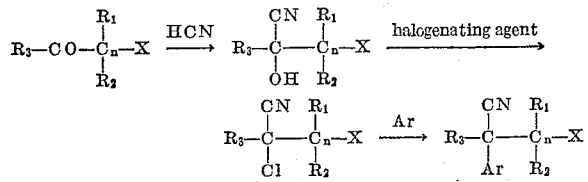

In this general formula:

Ar stands for a substituted or unsubstituted phenyl or naphthyl group;

$R_1$ and $R_2$ stand either for hydrogen, in which case the alkyl group forms a straight chain or $R_1$ stands for hydrogen or lower alkyl and $R_2$ is lower alkyl, in which case the alkyl group forms a branched chain;

X is a basic substituent bonded to a carbon atom of the alkyl chain ($C_n$) and stands for a primary, secondary, tertiary or cyclic amine group;

$R_3$ is either a straight or branched alkyl or aralkyl group in which the carbon atoms may be bridged by oxygen or sulphur, or $R_3$ is an alycyclic group, substituted or unsubstituted, such as, for example, cyclopropyl or cyclobutyl.

The alkyl chain should preferably have from 1–4 carbon atoms.

The basic ketones employed in the inventive process correspond to the general formula

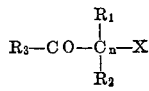

wherein the symbols have the meaning given above. Such basic ketones are readily available. These ketones may either be treated with HCN, if required in the presence of suitable solvents, or the salts of the amino-ketones are dissolved in water and—in the presence of water—immiscible solvents such as benzene or ether are reacted under stirring with an aqueous potassium cyanide or sodium cyanide solution. The aqueous phase of the reaction mixture is then carefully separated and the remaining solution is admixed with a halogenation agent, as for example thionyl chloride or phosphorus pentachloride. The halogenation product thus obtained is then reacted with an organic ring system (Ar) in the presence of a suitable catalyst, such as aluminum chloride or zinc chloride.

In accordance with the inventive process, basic aralkyl nitriles may be obtained directly and smoothly in a one-step process and in very good yield. In addition to the important economic and technical advantages obtained thereby, the present process is by far superior to known processes since no isomers are formed.

If optically active starting materials are employed, the resulting aralkyl nitriles will also exhibit optical activity.

The basic aralkyl nitriles obtained by the inventive process possess surprising pharmacological characteristics of different nature while having an exceedingly low acute toxicity. In particular, the compounds exhibit analgetic and spasmolytic properties and influence the motility. Further, with several analgetics they cause a supper-additive increase of the analgesia. The inventive products may thus be used as pharmaceuticals or as intermediaries in the production of pharmaceuticals.

The invention will now be described by several examples, it being understood, however, that these examples are given by way of illustration and not by way of limitation, and that many changes and alterations may be performed in, for example choice of starting materials, temperatures, quantities and process conditions in general without departing in any way from the spirit and scope of this invention as recited in the appended claims.

Example 1

A suspension is prepared from 108.5 grams of dimethylaminoethyl-cetylketonehydrochloride in 300 milliliters of water, and 500 milliliters of benzene are added thereto. A solution of 60 grams of potassium cyanide in 150 milliliters of water is then dropped into the suspension at 20–25° C. The addition of the cyanide solution is performed under vigorous stirring. The stirring is continued for 2–3 hours after the completed addition. The aqueous phase is thereafter seprated and discarded. 60 milliliters of thionyl chloride in 50 milliliters of benzene are thereafter poured into the benzene phase. In doing so, care is taken that the temperature does not rise above 25° C. This may be accomplished by temporary cooling. The reaction mixture is then heated for about 1 hour at 40° C., whereafter the liquid portions are expelled The residue thus obtained is primarily crystalline and is admixed with 800 milliliters of nitrobenzene and 1 liter of benzene Aluminum chloride is now added under vigorous mechanical agitation. The reaction mixture thus obtained is then heated to its boiling point for a further 3 hours, whereafter ice and concentrated hydrochloric acid are added. The aqueous hydrochloric acid solution is then carefully separated, filtered and made alkaline with sodium hydroxide. The reaction product which separates in this manner is then repeatedly extracted with ether. The combined ether extracts are then dried over sodium sulfate, the solvent is expelled and the residue is distilled in an oil vacuum. The reaction product thus obtained is α-di-methylaminoethyl-α-cetyl-benzylcyanide, which is identical with α-dimethylaminoethyl-α-phenyl stearic nitrile, having a boiling point at 0.2 mm. Hg of 218–220° C. M.P. of hydrochloride from methanol-ether is 155–156° C. The yield was 102 grams.

Example 2

70.5 grams of piperidylethyl-sec.butyl-ketonehydrochloride are dissolved in 250 milliliters of water. The solution is covered with a layer of 500 milliliters of benzene, whereafter a solution of 60 grams of potassium cyanide in 120 milliliters of water is added. The addition is performed slowly under vigorous stirring and at a temperature of 20-25° C. The agitation is continued for an additional 2-3 hours. The aqueous phase is then discarded, while the benzene phase is admixed at a temperature of 20-25° C. and under vigorous stirring with 60 milliliters of thionyl chloride in 50 milliliters of benzene. As soon as the addition of the halogenation agent has been completed, the reaction mixture is heated for one hour at 40° C., whereafter the liquid components are distilled off under a reduced pressure. The residue is admixed with 600 milliliters of nitrobenzene and one liter of benzene, whereafter 400 grams of aluminum chloride are added under strong agitation. The reaction mixture thus obtained is then heated to its boiling point for about 2-3 hours. Thereafter ice and hydrochloric acid are added and the aqueous phase is separated and discarded. The residue is filtered and made alkaline with sodium hydroxide, whereafter it is repeatedly extracted with ether. The combined ether extracts are dried over sodium sulfate, liberated from the solvent and the residue is subjected to an oil-vacuum distillation.

65 grams of α-phenyl-α-(2-piperidinoethyl)-β-ethyl-butyric acid nitrile are obtained having a boiling point of 0.2 mm. Hg of 147–148° C. M.P. of the hydrochloride is 202–203° C.

Example 3

A suspension is prepared from 84.3 grams of sec.butyl-(4 - chloroethyl-1-ethyl-piperazino)-ketone-hydrochloride in 400 milliliters of water. The suspension is covered with a layer of 500 milliliters of benzene, whereafter a solution of 120 grams of potassium cyanide in 250 milliliters of water is added. The addition is carried out slowly under strong agitation and at a temperature of about 15° C. The agitation is continued for a further 2-3 hours. The aqueous phase is separated and discarded, while 60 milliliters of thionyl-chloride are added to the benzene phase under stirring at 20-25° C. The reaction mixture is thereafter heated to about 40° C., whereafter the liquid components are distilled off under reduced pressure. The residue is admixed with 1 liter of benzene, and 400 grams of aluminum chloride are added under strong agitation. The reaction mixture thus obtained is then heated for about one hour to 40–50° C. The subsequent processing is performed as in the previous examples.

38 grams of α-phenyl-α-(chloroethyl-piperazinoethyl)-β-methyl-valeric acid nitrile are obtained. M.P. of the hydrochloride is 210–212° C.

Example 4

55 grams of piperidinoethyl-isopropyl-ketone are dissolved in 300 milliliters of ether, and 30 grams of anhydrous HCN are introduced into the solution thus obtained. After the introduction of the HCN, the reaction mixture is stirred for 2-3 hours at 20-25° C., whereafter 60 milliliters of thionyl-chloride are added. Instantaneously a syrup-like precipitate is formed which, upon agitation at a temperature of 30-35° C., becomes crystalline. This solid precipitate is separated from the liquid components, is admixed with 800 milliliters of benzene whereby a suspension is formed and 350 grams of aluminum chloride are then added to the suspension at 25–30° C. Thereafter, the reaction mixture is heated for two hours to its boiling point, whereafter ice and concentrated hydrochloric acid are added. In doing so, the hydrochloride of the reaction product i.e., α-phenyl-α-(2-piperidinoethyl)-β-methyl-butyric acid nitrile usually separates in crystalline form. The further processing of the reaction product was performed as described in the previous examples.

The yield was 48 g. M.P. of the hydrochloride is 206–207° C.

What is claimed is:

1. Basic aralkyl nitriles of the formula

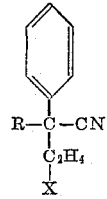

wherein R is a member of the class consisting of saturated aliphatic radicals having a chain containing from 3–16 C-atoms, including branched chains, and X is a member of the class consisting of dimethylamino, piperidine, and chloroethylpiperazine radicals.

2. As a new compound α-phenyl-α-(2-piperidinoethyl)-β-ethyl-butyric acid nitrile.

3. As a new compound α-phenyl-α-(chloroethyl-piperazinoethyl)-β-methyl-valeric acid nitrile.

4. As a new compound α-phenyl-α-(2-piperidinoethyl)-β-methyl-butyric acid nitrile.

5. The process as claimed in claim 9, wherein the halogenation is performed with thionyl chloride.

6. The process as claimed in claim 9, wherein said catalyst is zinc chloride.

7. The process as claimed in claim 9, wherein optically active starting materials are employed, whereby optically active aralkyl nitriles are obtained.

8. The process as claimed in claim 9, wherein the resulting bases are split with mineral acids.

9. A one-step process for the preparation of basic aralkyl nitriles of the formula

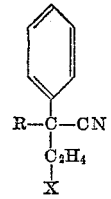

wherein R is a member of the class consisting of saturated aliphatic radicals having a chain containing from 3–16 C-atoms, including branched chains, and X is a member of the class consisting of dimethylamino, piperidine, and chloroethyl-piperazine radicals, which comprises reacting at room temperature a ketone of the formula $$R—CO—C_2H_4—X$$

wherein the symbols have the above designated meaning, with HCN, halogenating the hydroxy nitriles thus obtained, reacting the halogenation product with a member of the class consisting of benzene and a benzene-nitrobenzene mixture in the presence of aluminum chloride as catalyst and splitting the reaction product with a mineral acid.

References Cited in the file of this patent

UNITED STATES PATENTS

| | | |
|---|---|---|
| 2,793,226 | Schlesinger et al. | May 21, 1957 |
| 2,851,458 | Billinghurst | Sept. 9, 1958 |
| 2,897,229 | Stuehmer et al. | July 28, 1959 |

FOREIGN PATENTS

| | | |
|---|---|---|
| 533,541 | Canada | Nov. 20, 1956 |

OTHER REFERENCES

Wagner and Zook: Synthetic Organic Chemistry, pages 92 and 604 (1953).